United States Patent
Tzou (10) Patent No.: US 11,018,506 B2
(45) Date of Patent: May 25, 2021

(54) SMART GRID TIMING SYNCHRONIZATION METHOD, SYSTEM, DEVICE AND COMPUTER READABLE STORAGE MEDIUM

(71) Applicant: HANGZHOU VANGO TECHNOLOGIES, INC., Zhejiang (CN)

(72) Inventor: Ching-Kae Tzou, Zhejiang (CN)

(73) Assignee: HANGZHOU VANGO TECHNOLOGIES, INC., Zhejiang (CN)

( * ) Notice: Subject to any disclaimer, the term of this patent is extended or adjusted under 35 U.S.C. 154(b) by 373 days.

(21) Appl. No.: 16/200,665

(22) Filed: Nov. 27, 2018

(65) Prior Publication Data

US 2020/0036186 A1 Jan. 30, 2020

(30) Foreign Application Priority Data

Jul. 25, 2018 (CN) .......................... 201810827906.9

(51) Int. Cl.
*H02J 3/08* (2006.01)
*G06Q 50/06* (2012.01)
(Continued)

(52) U.S. Cl.
CPC .......... *H02J 3/08* (2013.01); *H02J 13/00009* (2020.01); *G05B 15/02* (2013.01); *G06Q 50/06* (2013.01)

(58) Field of Classification Search
CPC ....................................................... H02J 3/08
See application file for complete search history.

(56) References Cited

U.S. PATENT DOCUMENTS

| 5,917,870 A * | 6/1999 | Wolf ............... H04J 3/0688 370/503 |
| 8,819,161 B1 * | 8/2014 | Pannell ........... H04J 3/0697 709/208 |

(Continued)

FOREIGN PATENT DOCUMENTS

| CN | 1199292 A | 11/1998 |
| CN | 1307407 A | 8/2001 |

(Continued)

OTHER PUBLICATIONS

The 1st Office Action regarding Chinese Patent Application No. CN201810827906.9, dated Mar. 26, 2020. English Translation Provided by http://globaldossier.uspto.gov.

(Continued)

*Primary Examiner* — Jennifer L Norton
(74) *Attorney, Agent, or Firm* — Yue (Robert) Xu; Apex Attorneys at Law, LLP (57) ABSTRACT

A smart grid timing synchronization method, a smart grid timing synchronization system, a smart grid timing synchronization device and a computer readable storage medium are provided, which is applied to any synchronization device in a smart grid. The method includes: determining whether a clock frequency of a synchronization device is consistent with a preset fixed frequency, and if not, regulating the clock frequency of the synchronization device to be consistent with the preset fixed frequency. The synchronization device includes a communication device and a central coordinator.

7 Claims, 3 Drawing Sheets

(51) Int. Cl.
*G05B 15/02* (2006.01)
*H02J 13/00* (2006.01)

(56) References Cited

U.S. PATENT DOCUMENTS

| | | | | |
|---|---|---|---|---|
| 2004/0207264 | A1* | 10/2004 | Sato | H02J 3/38 307/11 |
| 2005/0180466 | A1* | 8/2005 | Franchuk | H04J 3/0697 370/503 |
| 2006/0165047 | A1* | 7/2006 | Kodama | H04B 3/542 370/350 |
| 2008/0279321 | A1* | 11/2008 | Bickel | H04B 3/542 375/356 |
| 2010/0111099 | A1* | 5/2010 | Yonge, III | H04B 3/54 370/458 |
| 2012/0187770 | A1* | 7/2012 | Slota | G05F 1/625 307/87 |
| 2014/0211867 | A1 | 7/2014 | Wolter | |
| 2015/0263785 | A1* | 9/2015 | Farrokhi | H04J 3/0638 375/257 |
| 2015/0295702 | A1* | 10/2015 | Ogawa | H04L 7/0016 370/324 |

FOREIGN PATENT DOCUMENTS

| | | | |
|---|---|---|---|
| CN | 101026411 | A | 8/2007 |
| CN | 101039145 | A | 9/2007 |
| CN | 102404855 | | 4/2012 |
| CN | 103532592 | A | 1/2014 |
| CN | 103684728 | A | 3/2014 |
| CN | 104601087 | | 5/2015 |
| CN | 105425898 | A | 3/2016 |
| CN | 105575092 | A | 5/2016 |
| CN | 106162844 | A | 11/2016 |
| EP | 0338668 | A2 * | 10/1989 ............ G04B 31/08 |
| WO | 2007016031 | A2 | 2/2007 |

OTHER PUBLICATIONS

IEEE Standard for Low-Rate Wireless Networks, IEEE Computer Society, https://ieeexplore.ieee.org/servlet/opac?punumber=7460873, Apr. 30, 2016.

The 3rd Office Action regarding Chinese Patent Application No. CN201810827906.9, dated Jul. 7, 2020. English Translation Provided by http://globaldossier.uspto.gov.

* cited by examiner

SMART GRID TIMING SYNCHRONIZATION METHOD, SYSTEM, DEVICE AND COMPUTER READABLE STORAGE MEDIUM

CROSS REFERENCE TO RELATED APPLICATION

The present application claims priority to Chinese Patent Application No. 201810827906.9, titled "SMART GRID TIMING SYNCHRONIZATION METHOD, SYSTEM, DEVICE AND COMPUTER READABLE STORAGE MEDIUM", filed on Jul. 25, 2018 with the Chinese Patent Office, which is incorporated herein by reference in its entirety.

FIELD

The present disclosure relates to the technical field of smart grid, in particular to a smart grid timing synchronization method, a smart grid timing synchronization system, a smart grid timing synchronization device and a computer storage medium.

BACKGROUND

A smart grid is an intellectualized power grid, also known as "Grid 2.0", which is established based on an integrated, high-speed bidirectional communication network. By applying the advanced sensing and measurement technologies, equipment technologies, control methods, and decision support systems, the smart grid can achieve the goal of reliability, security, economy, high efficiency, environmental friendliness and safe use of the power grid. The smart grid has features of self-healing, motivating and protecting users, resisting attacks, providing high quality of power that meets user needs, allowing access from various forms of power generation, and optimizing the efficiency of operation of power markets and assets. In the application of the smart grid, communication devices in the smart grid are required to communicate with the central coordinator in the smart grid in a timing synchronization manner.

In the conventional technology, a central coordinator sends a beacon signal to a communication device to achieve the timing synchronization between the central coordinator and the communication device.

However, in the conventional technology, the central coordinator is required to send the beacon signal periodically or regularly to each communication device communicating with the central coordinator. In addition, in the case of multiple central coordinators, timing synchronization between the multiple central coordinators is also achieved via beacon signals. If any of the central coordinator has a fault, the smart grid cannot achieve timing synchronization, resulting in a poor stability.

In view of the above, how to improve the stability of timing synchronization is a problem to be solved by those skilled in the art.

SUMMARY

A smart grid timing synchronization method is provided, to solve the technical problem of poor stability of timing synchronization. A smart grid timing synchronization system, a smart grid timing synchronization device and a computer readable storage medium are also provided according to the present disclosure.

In order to achieve the above objective, the following technical solution is provided.

A smart grid timing synchronization method, applied to a synchronization device in a smart grid, includes: determining whether a clock frequency of a synchronization device is consistent with a preset fixed frequency, and regulating the clock frequency of the synchronization device to be consistent with the preset fixed frequency if the clock frequency of the synchronization device is inconsistent with the preset fixed frequency, The synchronization device includes a communication device and a central coordinator.

Preferably, the determining whether the clock frequency of the synchronization device is consistent with the preset fixed frequency includes determining whether the clock frequency of the synchronization device is consistent with a frequency of a power line alternating current signal of the smart grid.

Preferably, before the determining whether the clock frequency of the synchronization is consistent with a frequency of a power line alternating current signal of the smart grid, the method further includes regulating an initial time point of a clock of the synchronization device to be consistent with a zero-crossing point of the power line alternating current signal of the smart grid.

Preferably, the determining whether the clock frequency is consistent with the frequency of the power line alternating current signal of the smart grid, includes:

detecting a first zero-crossing point of the power line alternating current signal in the current time period of the power line alternating current signal;

determining a sum of the first zero-crossing point and a clock cycle of the synchronization device as an expected zero-crossing point;

detecting a second zero-crossing point of the power line alternating current signal in the next time period of the power line alternating current signal; and determining whether the expected zero-crossing point is consistent with the second zero-crossing point, determining, if the expected zero-crossing point is inconsistent with the second zero-crossing point, that the clock frequency of the synchronization device is inconsistent with the frequency of the power line alternating current signal of the smart grid, determining, if the expected zero-crossing point is consistent with the second zero-crossing point, that the clock frequency of the synchronization device is consistent with the frequency of the power line alternating current signal of the smart grid.

Preferably, the regulating the clock frequency of the synchronization device to be consistent with the preset fixed frequency, includes:

calculating an absolute value of a difference between the clock frequency of the synchronization device and the preset fixed frequency;

determining a quotient obtained by dividing the absolute value by a preset number as a first clock frequency;

comparing the clock frequency of the synchronization device with the preset fixed frequency;

determining, if the clock frequency of the synchronization device is greater than the preset fixed frequency, a difference between the clock frequency of the synchronization device in the current clock cycle of the synchronization device and the first clock frequency as the clock frequency of the synchronization device in the next clock cycle, and repeating this step until the clock frequency of the synchronization device is equal to the preset fixed frequency; and determining, if the clock frequency of the synchronization device is less than the preset fixed frequency, a sum of the clock frequency of the synchronization device in the current clock cycle of the synchronization device and the first clock frequency as the clock frequency of the synchronization device in the next clock cycle, and repeating this step until the clock frequency of the synchronization device is equal to the preset fixed frequency.

Preferably, the method further includes: receiving a beacon at a beacon frequency to receive a signal, and/or transmitting a beacon at a beacon frequency to transmit a signal, where the beacon frequency is obtained by multiplying the preset fixed frequency by a preset number.

Preferably, the determining whether the clock frequency of the synchronization device is consistent with the preset clock frequency includes:

determining whether the clock frequency of the synchronization device is consistent with the preset clock frequency, at a frequency corresponding to the frequency of the power line alternating current signal of the smart grid.

A smart grid timing synchronization system, applied to a synchronization device in the smart grid, includes:

a first determining module, configured to determine whether a clock frequency of the synchronization device is consistent with a preset fixed frequency; and a first execution module, configured to regulate the clock frequency of the synchronization device to be consistent with the preset fixed frequency as the first determining module determining that the clock frequency of the synchronization device is inconsistent with the preset fixed frequency.

The synchronization device includes a communication device and a central coordinator.

A smart grid timing synchronization device includes:
a memory storing a computer program; and
a processor, configured to execute the computer program to perform the smart grid timing synchronization method according to any of the above embodiments.

A computer readable storage medium stores a computer program that, when executed by a processor, causes the processor to perform the smart grid timing synchronization method according to any of the above embodiments.

The smart grid timing synchronization method provided according to the present disclosure is applied to a synchronization device in a smart grid. The method includes determining whether the clock frequency of the synchronization device is consistent with the preset fixed frequency, and if not, regulating the clock frequency of the synchronization device to be consistent with the preset fixed frequency. The synchronization device includes a communication device and a central coordinator. In the smart grid timing synchronization method according to the present disclosure, it is determined whether the clock frequency of the synchronization device is consistent with a preset fixed frequency, and if not, the clock frequency of the synchronization device is regulated to be consistent with a preset fixed frequency, so that the clock frequency of the synchronization device is consistent with the preset fixed frequency. The synchronization device includes a communication device and a central coordinator, that is, the clock frequency of both the communication device and the central coordinator are consistent with the preset fixed frequency. Compared with the conventional technology that the clock frequency of the communication device is consistent with the clock frequency of the central coordinator communicating with the communication device, a situation that the smart grid cannot achieve timing synchronization due to a fault occurred in any one of multiple coordinators is avoid, which improves the stability of the smart grid timing synchronization. The smart grid timing synchronization system, device and computer readable storage medium provided in the present disclosure can also solve the above technical problem.

BRIEF DESCRIPTION OF DRAWINGS

In order to illustrate the embodiments of the present disclosure or the technical solutions in the conventional art more clearly, the drawings to be used in the embodiments or the description of the conventional art will be briefly described below. Apparently, the drawings in the following description are only some embodiments of the present disclosure, and those skilled in the art can obtain other drawings according to the provided drawings without any creative work.

DETAILED DESCRIPTION

The technical solutions in the embodiments of the present disclosure are clearly and completely described in conjunction with the drawings in the following embodiments of the present disclosure. It is obvious that the described embodiments are only some of the embodiments of the present disclosure, and not all of the embodiments. All other embodiments obtained by those skilled in the art based on the embodiments of the present disclosure without creative efforts all fall in the scope of the present disclosure.

A smart grid timing synchronization method provided according to an embodiment of the present disclosure is applied to any synchronization device in a smart grid. Therefore, each step of the smart grid timing synchronization method may be performed by a synchronization device, or may be performed by a smart grid timing synchronization system provided according to an embodiment of the present disclosure. For the convenience of description, the steps of the smart grid timing synchronization method provided according to the present embodiment of the present disclosure is described as being performed by a synchronization device.

Figure 1:
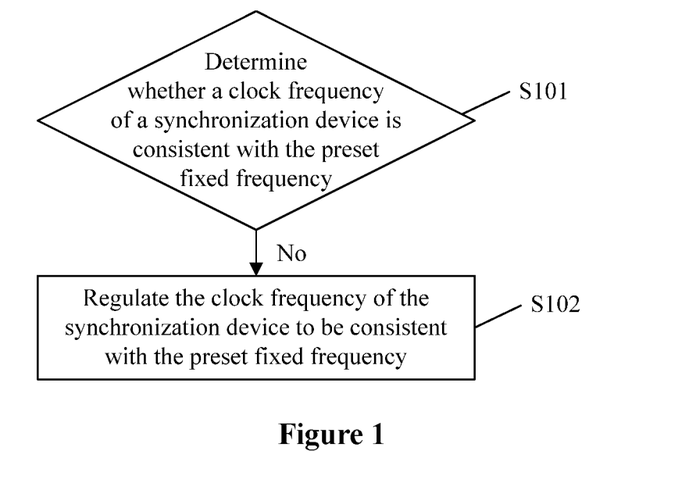
FIG. 1 is a first flowchart of a smart grid timing synchronization method according to an embodiment in the present disclosure.

Reference is made to FIG. 1, which is a first flowchart of a smart grid timing synchronization method according to an embodiment in the present disclosure.

A smart grid timing synchronization method according to the embodiment of the present disclosure is applied to a synchronization device in the smart grid, and includes the following steps S101 and S102.

In step S101, it is determined whether a clock frequency of a synchronization device is consistent with a preset fixed frequency. If the clock frequency of the synchronization device is inconsistent with a preset fixed frequency, step S102 of regulating the clock frequency of the synchronization device to be consistent with the preset fixed frequency is performed.

The synchronization device includes a communication device and a central coordinator.

The smart grid in the present disclosure is an intellectualized power grid, also known as "Grid 2.0", which is established based on an integrated, high-speed bidirectional communication network. By applying the advanced sensing and measurement technologies, equipment technologies, control methods, and decision support systems, the smart grid can achieve the goal of reliability, security, economy, high efficiency, environmental friendliness and safe use of the power grid. The smart grid has features of self-healing, motivating and protecting users, resisting attacks, providing high quality of power that meets user needs, allowing access from various forms of power generation, and optimizing the efficiency of operation of power markets and assets. The synchronization device in the present disclosure refers to a device in a smart grid that is required to implement timing synchronization, including but not limited to a communication device, a central coordinator and a central hub in a smart grid. In actual applications, a synchronization device determines whether its clock frequency is consistent with a preset fixed frequency, and if its clock frequency is inconsistent with the preset fixed frequency, the clock frequency of the synchronization device is regulated to be consistent with the preset fixed frequency. Since the clock frequency of each synchronization device is consistent with the preset fixed frequency, the clock frequency of the entire smart grid is the same as the preset fixed frequency, thereby achieving the timing synchronization of the entire smart grid by means of the preset fixed frequency. It should be noted that, the preset fixed frequency generally is independent of the synchronization device, which may be a frequency of the power line alternating current signal of a smart grid. Accordingly, the step S101 of determining whether the clock frequency of the synchronization device is consistent with the preset fixed frequency may in particular is determining whether the clock frequency of the synchronization device is consistent with the frequency of the power line alternating current signal of the smart grid.

In the present disclosure, the smart grid timing synchronization method is provided, which is applied to any synchronization device in a smart grid. In the method, it is determined whether the clock frequency of the synchronization device is consistent with the preset fixed frequency, if the clock frequency of the synchronization device is inconsistent with the preset fixed frequency, the clock frequency of the synchronization device is regulated to be consistent with the preset fixed frequency. The synchronization device includes a communication device and a central coordinator. In the smart grid timing synchronization method according to the present disclosure, by determining whether the clock frequency of the synchronization device is consistent with a preset fixed frequency, and if not, regulating the clock frequency of the synchronization device to be consistent with the preset fixed frequency, the clock frequency of the synchronization device is consistent with the preset fixed frequency. Since the synchronization device includes a communication device and a central coordinator, the clock frequencies of both the communication device and the central coordinator are consistent with the preset fixed frequency. As compared with the conventional technology that the clock frequency of the communication device is consistent with the clock frequency of the central coordinator communicating with the communication device, the technical solution according to the embodiment of the present disclosure can avoid a situation that the smart grid cannot achieve timing synchronization due to a fault in any one of multiple coordinators, which improves the stability of the smart grid timing synchronization.

In a smart grid timing synchronization method provided according to an embodiment of the present disclosure, before determining whether the clock frequency of the synchronization is consistent with the frequency of the power line alternating current signal of the smart grid, an initial time point of a clock of the synchronization device may be regulated to be consistent with a zero-crossing point of the power line alternating current signal of the smart grid.

In practical applications, in order to conveniently determine whether the clock frequency of the synchronization device is consistent with the frequency of the power line alternating current signal of the smart grid, before determining whether the clock frequency of the synchronization is consistent with the frequency of the power line alternating current signal of the smart grid, the initial time point of the clock of the synchronization device may be regulated to be consistent with a zero-crossing point of the power line alternating current signal of the smart grid. In this way, whether the clock frequency of the synchronization device is consistent with the frequency of the power line alternating current signal may be determined by directly detecting in each period whether the clock initial time point of the synchronization device is consistent with the zero-crossing point of the power line alternating current signal of the smart grid. If they are consistent, it is determined that the clock frequency of the synchronization device is consistent with the frequency of the power line alternating current signal of the smart grid. If they are not consistent, it is determined that the clock frequency of the synchronization device is inconsistent with the frequency of the power line alternating current signal of the smart grid.

Figure 2:
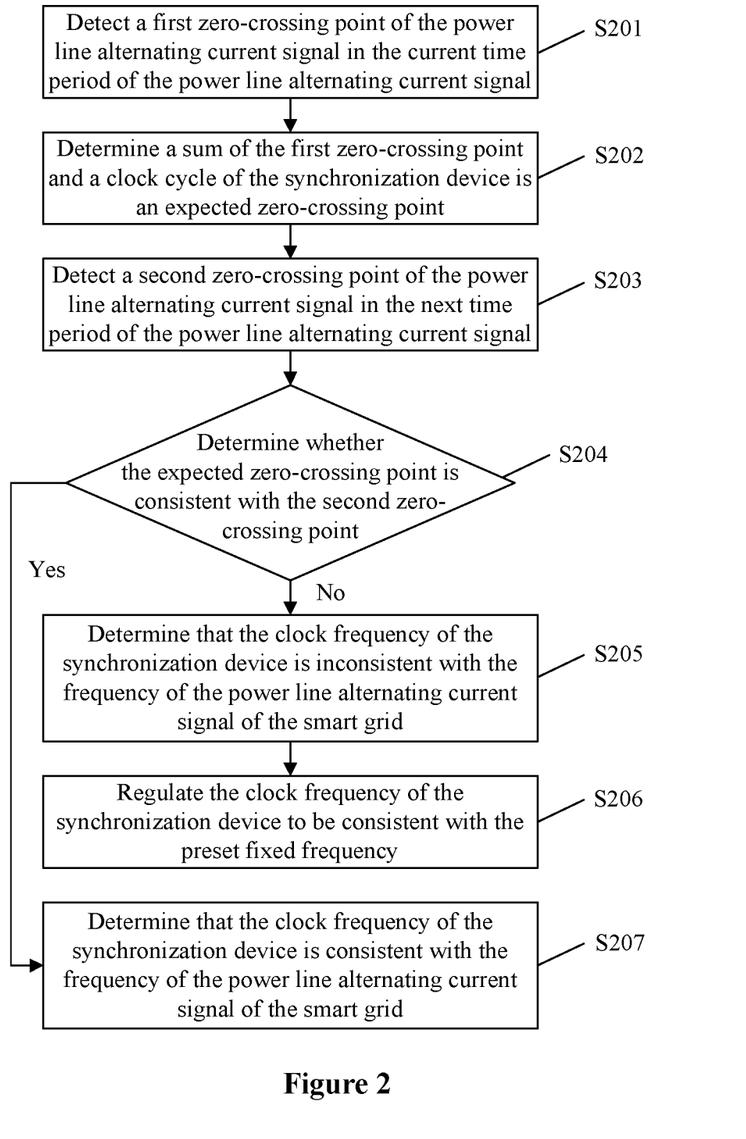
FIG. 2 is a second flowchart of a smart grid timing synchronization method according to an embodiment in the present disclosure.

Reference is made to FIG. 2, which is a second flowchart of a smart grid timing synchronization method according to an embodiment in the present disclosure.

A smart grid timing synchronization method according to the embodiment of the present disclosure includes the following steps S201 to S207.

In step S201, a first zero-crossing point of the power line alternating current signal in the current time period of the power line alternating current signal is detected.

In step S202, a sum of the first zero-crossing point and a clock cycle of the synchronization device is determined as an expected zero-crossing point.

In step S203, a second zero-crossing point of the power line alternating current signal in the next time period of the power line alternating current signal is detected.

In step S204, it is determined whether the expected zero-crossing point is consistent with the second zero-crossing point. If the expected zero-crossing point is inconsistent with the second zero-crossing point, step S205 is performed, and if the expected zero-crossing point is consistent with the second zero-crossing point, step S207 is performed.

In step S205, it is determined that the clock frequency of the synchronization device is inconsistent with the frequency of the power line alternating current signal of the smart grid, and then step S206 is performed.

In step S206, the clock frequency of the synchronization device is regulated to be consistent with the preset fixed frequency.

In step S207, it is determined that the clock frequency of the synchronization device is consistent with the frequency of the power line alternating current signal.

The power line alternating current signal in the embodiment of the present disclosure is a sine wave signal, which has a waveform including zero-crossing points. The present embodiment is explained with a specific example. Assuming that the clock frequency of the power line alternating current signal is 0.1 hz, the time period of the power line alternating current is 10 s, and the first zero-crossing point of the power line alternating current signal in the current period is 8:10:03, the first zero-crossing point in the next period of the power line alternating current signal corresponding to the second zero crossing point is 8:10:13. Assuming that the clock frequency of the communication device is 0.2 Hz, the time period of the communication device is 5 s. Under the pre-assumption that clock frequency of the communication device is consistent with the frequency of the power line alternating current signal, the sum of the first zero-crossing point and the time period of the communication device is equal to the second zero-crossing point, that is, the expected zero-crossing point is consistent with the second zero-crossing point. According to the above assumption, since the expected zero-crossing point is 8:10:08, which is not the same as the second zero-crossing point of 8:10:13, the clock cycle of the synchronization device is inconsistent with the frequency of the power line alternating current signal. It is noted that, although in the present embodiment, whether the clock frequency of the synchronization device is consistent with the clock frequency of the power line alternating current signal is determined by comparing the zero-crossing points in the current cycle and the next cycle, in practices whether the clock frequency of the synchronization device is consistent with the clock frequency of the power line alternating current signal may be determined by comparing the zero-crossing points of the current cycle and next N cycles, where N is a positive integer greater than 1.

In a smart grid timing synchronization method according to an embodiment of the present disclosure, the clock frequency of the synchronization device may be regulated to be consistent with a preset fixed frequency by the following steps 1 to 5.

In step 1, an absolute value of a difference between the clock frequency of the synchronization device and the preset fixed frequency is calculated.

In step 2, a quotient obtained by dividing the absolute value by a preset number is determined as a first clock frequency.

In step 3, the clock frequency is compared with the preset fixed frequency.

In step 4, if the clock frequency of the synchronization device is greater than the preset fixed frequency, a difference between the current clock frequency of the synchronization device in the current clock cycle of the synchronization device and the first clock frequency is determined as the clock frequency of the synchronization device in the next clock cycle. This step is repeated until the clock frequency of the synchronization device is equal to the preset fixed frequency.

In step 5, if the clock frequency of the synchronization device is less than the preset fixed frequency, a sum of the current clock frequency of the synchronization device in the current clock cycle of the synchronization device and the second clock frequency is determined as the clock frequency of the synchronization device in the next clock cycle. This step is repeated until the clock frequency of the synchronization device is equal to the preset fixed frequency.

In the practical application, in the process of regulating a clock frequency of the synchronization device be consistent with a preset fixed frequency, in order to prevent the clock frequency of the synchronization device from changing too fast and causing problems in the operation of the synchronization device, the clock frequency of the synchronization device may be regulated to be consistent with the preset fixed frequency according to the present embodiment. The determining the quotient value obtained by dividing the absolute value by the preset number as the first clock frequency as described in this embodiment is equivalent to determining the ratio of the absolute value to the preset number as the first clock frequency. The preset number may be flexibly determined according to actual needs. Assuming that the absolute value is 10 and the preset number is 2, the first clock frequency is 5. Since the absolute value is an absolute value of the difference between the clock frequency of the synchronization device and the preset fixed frequency, and the first clock frequency is the quotient value obtained by dividing the absolute value by the preset number, it is understood that, during the regulation, the clock frequency of the synchronization device is consistent with the preset fixed frequency after the preset number of times of regulations. It should be noted that, in a case that the clock frequency of the synchronization device is greater than the preset fixed frequency, the current clock frequency of the synchronization device is decreased gradually by the first clock frequency, and in a case that the clock frequency of the synchronization device is less than the preset fixed frequency, the current clock frequency of the synchronization device is increased gradually by the first clock frequency.

A smart grid timing synchronization method according to an embodiment of the present disclosure may further include receiving a beacon at a beacon frequency to receive a signal, and/or transmitting a beacon at a beacon frequency to transmit a signal, where the beacon frequency is obtained by multiplying the preset fixed frequency by a preset number.

In the actual application, after the clock frequency of the synchronization device is consistent with the preset fixed frequency which achieves the timing synchronization of the smart grid, the synchronization device may use a beacon to receive and/or transmit a signal. Accordingly, a central coordinator sends a beacon to a communication device to transmit a signal to the communication device, and the communication device receives the beacon to receive the signal sent by the central coordinator. The application of the beacon may be implemented as the conventional art, which is not specifically limited herein. Since the beacon frequency is obtained by multiplying the preset fixed frequency by a preset number, after the central coordinator sends a beacon to the communication device, the communication device may predict the arrival of the next beacon according to the beacon frequency and its own clock frequency, thereby preparing for the transmission of the next signal in advance. For example, the communication device may enter a working state from a sleep state before the next beacon arrives. Additionally, the central coordinator may operate in a beacon-enabled mode or use other known technology to achieve frame synchronization with the communication device. In an embodiment, when the communication device joins the central coordinator, it detects the time when the beacon appears, and then achieves frame synchronization with the controller through an appropriate known handshake protocol. It should be noted that, in the beacon-enabled mode, a (time) slotted Carrier Sense Multiple Access/Collision Avoidance mechanism may be used to achieve the synchronization between a communication device and a central coordinator, in which the time slot boundary of each communication device in the smart grid is aligned to the time slot boundary (i.e., the transmission start time) of the central coordinator to which the communication device belongs, and the synchronization is achieved by decoding the beacon frame. The medium access control layer in the network in the beacon-enabled mode controls the physical layer to start all transmissions on the boundary of a back-off time-slot period. In typical applications, the beacon interval is in a range from tens of milliseconds to hundreds of seconds, depending on different parameter settings.

Optionally, in order to reduce the power consumption of the communication device, the central coordinator in the beacon-enabled mode may communicate with the communication device based on the superframe structure. That is, the central coordinator in the beacon-enable mode logically defines and manages slots of different characteristics. For example, on a timeline, the beacon interval is divided into active and inactive periods. In the inactive period, all communication devices managed by the central coordinator may be powered down or in a sleep mode to reduce power consumption. The active time period is composed of the beacon, a contention access period, and a non-contention access period. In the contention access period, the communication device is connected to the central coordinator through a random access mechanism. In the non-contention access period, the communication device uses channel resources in a designed idle slot, and is connected to the central coordinator through the time-division multiplexing access mechanism. Certainly, other protocols, such as On-demand media access control protocol, may be used to reduce the power consumption of communication devices.

In a practical application, a smart grid timing synchronization method according to an embodiment of the present disclosure may include the following steps a to e.

In step a, the clock frequencies of the communication device and the central coordinator are regulated to be consistent with the frequency of the power line alternating current signal of the smart grid.

In step b, the central coordinator operates in the beacon-enabled mode to achieve the frame synchronization with the communication device.

In step c, the central coordinator allocates exclusive working period for each communication device managed by central coordinator through the beacon, and ensures that the exclusive working periods of the respective communication devices are different from each other.

In step d, the central coordinator transmits the beacon containing the exclusive working period to the corresponding communication device according to the cycle of the power line alternating current signal.

In step e, the communication device transmits or receives signals during its exclusive working period, and enters a sleep state during non-exclusive working period.

It should be noted that, in the practical application, the frequency of the power line alternating current signal may have different values in different smart grids. It is understood that, since the central coordinator sends a beacon according to the period of the power line alternating current signal, the communication device receives the beacon periodically. Since the communication device enters the sleep state during non-exclusive working period, and transmits or receives signals during the exclusive working period, i.e., entering the working state, the communication device switches between the sleep state and the working state.

In the smart grid timing synchronization method according to an embodiment of the present disclosure, the determining whether the clock frequency of the synchronization device is consistent with the preset fixed frequency is performed, at a frequency corresponding to the frequency of the power line alternating current signal of the smart grid.

In the actual application, in order to alleviate the service pressure of the synchronization device, the synchronization device may determine whether the clock frequency of the synchronization device is consistent with the preset fixed frequency at the time interval corresponding to the preset time frequency, or at a preset multiple of the time interval corresponding to the preset time frequency, where the preset multiple may be determined according to actual needs.

Figure 3:
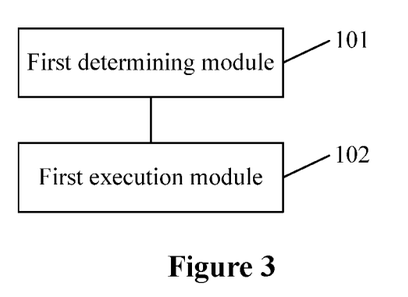
FIG. 3 is a structural schematic diagram of a smart grid timing synchronization system according to an embodiment in the present disclosure.

A smart grid timing synchronization system is further provided according to the present disclosure, which also has the effects of the smart grid timing synchronization method according to the embodiment of the present disclosure. Reference is made to FIG. 3, which is a structural schematic diagram of a smart grid timing synchronization system according to an embodiment in the present disclosure.

A smart grid timing synchronization system according to an embodiment of the present disclosure, which is applied to a synchronization device in a smart grid, includes a first determining module 101 and a first execution module 102.

The first determining module 101 is configured to determine whether a clock frequency of a synchronization device is consistent with a preset fixed frequency.

The first execution module 102 is configured to regulate the clock frequency of the synchronization device to be consistent with the preset fixed frequency if the first determining module determines that the clock frequency of the synchronization device is inconsistent with the preset fixed frequency.

The synchronization device includes a communication device and a central coordinator.

In a smart grid timing synchronization system according to an embodiment of the present disclosure, the first determining module may include a first determining unit.

The first determining unit is configured to determine whether the clock frequency of the synchronization device is consistent with a frequency of a power line alternating current signal of the smart grid.

A smart grid timing synchronization system according to an embodiment of the present disclosure may further include a regulation module.

The regulation module is configured to regulate a clock initial time point of the synchronization device to be consistent with a zero-crossing point of the power line alternating current signal of the smart grid before the first determining unit determines whether the clock frequency of the synchronization device is consistent with the frequency of the power line alternating current signal of the smart grid.

In a smart grid timing synchronization system according to an embodiment of the present disclosure, the first determining unit may include a first detecting subunit, a determining subunit, a second detecting unit and a first determining subunit.

The first detecting subunit is configured to detect a first zero-crossing point of the power line alternating current signal in the current time period of the power line alternating current signal.

The determining subunit is configured to determine a sum of the first zero-crossing point and the clock cycle of the synchronization device as an expected zero-crossing point.

The second detecting subunit is configured to detect a second zero-crossing point of the power line alternating current signal in the next time period of the power line alternating current signal.

The first determining subunit is configured to determine whether the expected zero-crossing point is consistent with the second zero-crossing point, determine in a case of negative determination, that the clock frequency of the synchronization device is inconsistent with the frequency of the power line alternating current signal of the smart gird, and determine, in a case of positive determination, that the clock frequency of the synchronization device is consistent with the frequency of the power line alternating current signal of the smart gird.

In a smart grid timing synchronization system according to an embodiment of the present disclosure, the first execution module may include a calculation unit, a determining unit, a comparing unit, a first execution unit and a second execution unit.

The calculation unit is configured to calculate an absolute value of a difference between the clock frequency of the synchronization device and the preset fixed frequency.

The determining unit is configured to determine a quotient value obtained by dividing the absolute value by the preset number as a first clock frequency.

The comparing unit is configured to compare the clock frequency of the synchronization device with the preset fixed frequency.

The first execution unit is configured to determine a difference between the current clock frequency of the synchronization device in the current clock cycle of the synchronization device and the first clock frequency as the clock frequency of the synchronization device in the next clock cycle when the comparing unit determines that clock frequency of the synchronization device is greater than the preset fixed frequency, and repeat this step until the clock frequency of the synchronization device is equal to the preset fixed frequency.

The second execution unit is configured to determine a sum between the current clock frequency of the synchronization device in the current clock cycle of the synchronization device and the first clock frequency as the clock frequency of the synchronization device in the next clock cycle when the comparing unit determines that clock frequency of the synchronization device is less than the preset fixed frequency, and repeat this step until the clock frequency of the synchronization device is equal to the preset fixed frequency.

A smart grid timing synchronization system according to an embodiment of the present disclosure further includes a transmission unit.

The transmission unit is configured to receive a beacon at a beacon frequency to receive a signal, and/or transmit a beacon at a beacon frequency to transmit a signal, where the beacon frequency is obtained by multiplying the preset fixed frequency by a preset number.

In a smart grid timing synchronization system according to an embodiment of the present disclosure, the first determining module may include a third determining unit.

The third determining unit is configured to determine whether the clock frequency of the synchronization device is consistent with the preset fixed frequency, at a frequency corresponding to the frequency of the power line alternating current signal of the smart grid.

Figure 4:
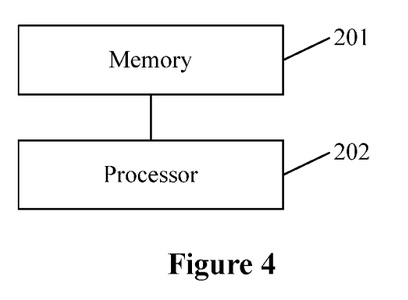
FIG. 4 is a structural schematic diagram of a smart grid timing synchronization device according to an embodiment in the present disclosure.

A smart grid timing synchronization device and computer readable storage medium are further provided according to the present disclosure, which have the effect of the smart grid timing synchronization method according to the embodiment of the present disclosure. Reference is made to FIG. 4, which is a structural schematic diagram of a smart grid timing synchronization device according to an embodiment of the present disclosure.

The smart grid timing synchronization device according to the embodiment of the present disclosure includes a memory 201 storing a computer program, and a processor 202 configured to perform, when executing the computer program, the smart grid timing synchronization method according to any one of the above embodiments.

A computer readable storage medium provided according to an embodiment of the present disclosure stores a computer program which, when executed by a processor, cause the processor to perform the smart grid timing synchronization method according to any one of the above embodiments.

A computer readable storage medium related to the present disclosure includes a Random Access Memory (RAM), a memory, a Read-Only Memory (ROM), an electrically programmable ROM, an electrically erasable programmable ROM, a register, a hard disk, a removable disk, a CD-ROM, or any other form of storage medium known in the art.

For a description of the relevant parts in the smart grid timing synchronization system, the smart grid timing synchronization device, and the computer readable storage medium according to the embodiments of the present disclosure, one may refer to the detailed description of the corresponding part in the smart grid timing synchronization method according to the embodiments of the present disclosure, which will not be repeated herein. In addition, the parts of the above technical solutions according to the embodiments of the present disclosure that are consistent with the implementation principles of the corresponding technical solutions in the conventional art are not described in detail, so as to avoid redundancy.

The above description of the disclosed embodiments enables those skilled in the art to implement or use the technical solution in the present disclosure. Various modifications to these embodiments are obvious to those skilled in the art, and the general principles defined herein may be implemented in other embodiments without departing from the spirit or scope of the application. Therefore, the present disclosure is not limited to the embodiments shown herein, but is consistent with the broadest scope of the principles and novel features disclosed herein.

The invention claimed is:

1. A smart grid timing synchronization method, applied to a synchronization device in a smart grid, comprising:
   determining whether a clock frequency of a synchronization device is consistent with a preset fixed frequency; and
   regulating the clock frequency of the synchronization device to be consistent with the preset fixed frequency if the clock frequency of the synchronization device is inconsistent with the preset fixed frequency,
   wherein the synchronization device comprises a communication device and a central coordinator, and
   wherein the preset fixed frequency is a frequency of a power line alternating current signal of the smart grid.

2. The smart grid timing synchronization method according to claim 1, wherein before the determining whether the clock frequency of the synchronization device is consistent with the frequency of the power line alternating current signal of the smart grid, the smart grid timing synchronization method further comprises:
   regulating an initial time point of a clock of the synchronization device to be consistent with a zero-crossing point of the power line alternating current signal of the smart grid.

3. The smart grid timing synchronization method according to claim 1, wherein the determining whether the clock frequency is consistent with the frequency of the power line alternating current signal of the smart grid comprises:

detecting a first zero-crossing point of the power line alternating current signal in a current time period of the power line alternating current signal;

determining a sum of the first zero-crossing point and a clock cycle of the synchronization device as an expected zero-crossing point;

detecting a second zero-crossing point of the power line alternating current signal in a next time period of the power line alternating current signal;

determining whether the expected zero-crossing point is consistent with the second zero-crossing point;

determining, if the expected zero-crossing point is inconsistent with the second zero-crossing point, that the clock frequency of the synchronization device is inconsistent with the frequency of the power line alternating current signal of the smart grid; and determining, if the expected zero-crossing point is consistent with the second zero-crossing point, that the clock frequency of the synchronization device is consistent with the frequency of the power line alternating current signal of the smart grid.

4. The smart grid timing synchronization method according to claim 3, wherein the regulating the clock frequency of the synchronization device to be consistent with the preset fixed frequency, comprises:

calculating an absolute value of a difference between the clock frequency of the synchronization device and the preset fixed frequency;

determining a quotient obtained by dividing the absolute value by a preset number as a first clock frequency;

comparing the clock frequency of the synchronization device with the preset fixed frequency;

determining, if the clock frequency of the synchronization device is greater than the preset fixed frequency, a difference between the clock frequency of the synchronization device in a current clock cycle of the synchronization device and the first clock frequency as the clock frequency of the synchronization device in a next clock cycle, and repeating this step until the clock frequency of the synchronization device is equal to the preset fixed frequency; and determining, if the clock frequency of the synchronization device is less than the preset fixed frequency, a sum of the clock frequency of the synchronization device in the current clock cycle of the synchronization device and the first clock frequency as the clock frequency of the synchronization device in the next clock cycle, and repeating this step until the clock frequency of the synchronization device is equal to the preset fixed frequency.

5. The smart grid timing synchronization method according to claim 3, further comprising:

receiving and/or transmitting a beacon at a beacon frequency as a signal, wherein the beacon frequency is obtained by multiplying the preset fixed frequency by a preset number.

6. A smart grid timing synchronization device, comprising:

a memory storing a computer program; and a processor configured to execute the computer program to:

determine whether a clock frequency of a synchronization device is consistent with a preset fixed frequency; and regulate the clock frequency of the synchronization device to be consistent with the preset fixed frequency if the clock frequency of the synchronization device is inconsistent with the preset fixed frequency, wherein the preset fixed frequency is a frequency of a power line alternating current signal of the smart grid.

7. A non-transitory computer readable storage medium, wherein the computer readable storage medium stores a computer program that, when executed by a processor, causes the processor to:

determine whether a clock frequency of a synchronization device is consistent with a preset fixed frequency; and regulate the clock frequency of the synchronization device to be consistent with the preset fixed frequency if the clock frequency of the synchronization device is inconsistent with the preset fixed frequency, wherein the preset fixed frequency is a frequency of a power line alternating current signal of the smart grid.

* * * * *